US006401996B1

(12) United States Patent
Thom et al.

(10) Patent No.: US 6,401,996 B1
(45) Date of Patent: Jun. 11, 2002

(54) ARTICLE CARRYING ATTACHMENT FOR WALKERS AND THE LIKE

(75) Inventors: Paul Thom, Montclair; Kurt Landsberger, Verona, both of NJ (US)

(73) Assignee: Bel-Art Products, Inc., Pequannock, NJ (US)

( * ) Notice: Subject to any disclaimer, the term of this patent is extended or adjusted under 35 U.S.C. 154(b) by 46 days.

(21) Appl. No.: 09/675,936

(22) Filed: Sep. 29, 2000

(51) Int. Cl.[7] .................................................. B60R 9/00
(52) U.S. Cl. ......................... 224/407; 224/409; 224/560
(58) Field of Search ................................. 224/407, 409, 224/411, 553, 555, 560, 420; D3/10, 11

(56) References Cited

U.S. PATENT DOCUMENTS

| | | | | |
|---|---|---|---|---|
| 3,957,071 A | | 5/1976 | Kenner | |
| 4,158,428 A | | 6/1979 | Bates | |
| 4,184,618 A | | 1/1980 | Jones | |
| 4,257,545 A | | 3/1981 | Rhyan | |
| 4,339,063 A | | 7/1982 | Trubiano | |
| 4,376,502 A | * | 3/1983 | Cohen | 224/411 |
| 4,449,750 A | | 5/1984 | Pultman | |
| 4,526,419 A | | 7/1985 | Bowman et al. | |
| 4,676,416 A | | 6/1987 | Harmon | |
| D324,504 S | | 3/1992 | Olsen | |
| D340,012 S | * | 10/1993 | Azzarelli | D12/130 |
| 5,531,238 A | * | 7/1996 | Azzarelli et al. | 224/409 |
| 5,813,582 A | * | 9/1998 | Wright | 224/407 |

OTHER PUBLICATIONS

Maddak, Inc., Catalog 1294, pp. 1, 2, 3, 6, 7.

* cited by examiner

*Primary Examiner*—Stephen K. Cronin
*Assistant Examiner*—Maerena W. Brevard
(74) *Attorney, Agent, or Firm*—Lawrence G. Fridman

(57) ABSTRACT

An article-carrying apparatus is provided for attachment to a mobile walker having a frame including at least one generally horizontal frame member supported by one or more generally vertical depending legs. The carrier includes a front panel, a rear panel a pair of opposed side panels and a base panel having integral connecting units enabling the panels to be snap-fitted together during assembly. The side panels have integral brace members adapted for being secured to the vertical depending walker legs. The side panels include inverted U-shaped handles sized and shaped for being pivotally carried on the generally horizontal frame member.

14 Claims, 10 Drawing Sheets

ARTICLE CARRYING ATTACHMENT FOR WALKERS AND THE LIKE

BACKGROUND OF THE INVENTION

1. Field of the Invention

The present invention relates generally to article carrying baskets, and more particularly to an article carrying basket adapted for attachment to mobile walkers used by individuals when they need assistance or additional support when walking.

2. Description of the Prior Art

Support devices which are mobile and used as walking aids are generally referred to as "walkers". These devices generally consist of a three-sided frame formed of a front and side portions which are open at the rear to allow the user to occupy the space defined by the front and side portions and to support himself or herself at the sides of the frame by handle grip bars. These walkers are widely used by elderly individuals, as well as individuals who are recuperating from operations or have suffered physical injury or disability and need additional support or assistance to move about safely.

While these walkers offer assistance or support to individuals, it is difficult for the individuals to transport various articles or items about when using the walker. The movement of the walker necessarily involves the use of both hands, so that the individual is unable to carry anything when manipulating the walker. This creates a considerable inconvenience to the user.

Container accessories specifically designed for attachment to walkers have been developed. For example, various representative prior art carrier attachment structures are disclosed in U.S. Pat. Nos. 4,184,618; 4,676,416 and 4,449,750. However, each of the structures disclosed in the aforementioned representative patents suffer from one or more drawbacks and/or limitations.

U.S. Pat. No. 4,184,618 to Jones discloses a box-like caddy suspended to a horizontal cross member of the walker by means of hangers attached to opposite walls of the caddy. No additional means are provided for securing the caddy to the walker. Consequently, the disclosed structure is subject to being shifted about during movement of the walker, or rotating about the hanger attachments, and thereby tipping, under the weight of items placed in the caddy. In addition, the disclosed caddy does not have means for being manually transported apart from the walker. Furthermore, Jones discloses a relatively heavy, non-collapsible caddy which is not amenable to being efficiently packaged for storage, shipping, etc.

U.S. Pat. No. 4,676,416 to Harmon discloses a collapsible carrier which is formed from a flexible sheet fabric type material. The carrier is provided with hanging straps designed to be looped around various horizontal members of the walker such that the attached carrier is positioned entirely within the U-shaped space defined by the front and side portions of the walker. Consequently, the person using the walker cannot occupy the majority of this space when the carrier is attached. Furthermore, the carrier is not adapted for being manually carried independent of the walker.

U.S. Pat. No. 4,449,750 to Harmon discloses a container accessory configured for removable attachment to a walker. However, the disclosed container includes a framework of tubular frame members and panels constructed from a relatively heavy material, e.g., aluminum, and has a relatively complex construction. Consequently, the disclosed container is not amenable to being efficiently packaged, stored, or assembled. Furthermore, the container is not designed for being carried about or used apart from the walker.

Accordingly, there is an established need for an article carrying attachment for a mobile walker overcoming the aforementioned drawbacks and limitations of the prior art.

SUMMARY OF THE INVENTION

It is an object of the present invention to provide an article carrier removably attachable to a mobile walker and having a simple construction amenable to being efficiently assembled and disassembled with minimal effort by an individual with limited disability without assistance and tools.

It is another object of the present invention to provide an article carrier having structure for pivotally supporting the carrier about a horizontal member of a walker, wherein the geometric design of the carrier enables a user to carry items therein without auxiliary carrier support.

It is a further object of the present invention to provide an article carrier having extendible arms adapted for bracing the carrier against the walker, wherein the arms can be selectively adjusted to alter the horizontal position of the carrier in order to accommodate multiple walker designs.

It is still a further object of the present invention to provide an article carrier having means for enabling the carrier to be manually transported for use apart from the mobile walker.

One aspect of the invention provides an article-carrying apparatus including a front panel, a rear panel, a base panel and a pair of opposed side panels each having peripherally positioned snap-fit connection means for facilitating panel-to-panel attachment during assembly. The side panels each have an inverted U-shaped handle portion including an inner curvature sized and shaped for frictionally engaging a horizontal frame member of the walker and for enabling pivotal support of the side panel thereon. A pair of horizontally disposed slidable arms are maintained beneath the base panel and can be outwardly extended to engage vertical extending legs of the walker.

As to another aspect of the invention, the snap fit connection means are comprised of individual connecting units formed on adjacent panels. A pair of resilient tong members separated by a stiffening member are provided extending outwardly from the periphery of one panel. A slot-shaped opening provided in a corresponding adjacent panel is sized and shaped for having the tong members snap-fitted therethrough. The panels can be disassembled by manually deflecting the tong members while pulling the adjacent panels apart.

A further embodiment of the invention provides slidably extendable arms secured to the underside of the base panel by integral support members and having a unitary molded construction including forked and C-shaped ends separated by a main body portion. The forked end includes a pair of resilient prongs which are inwardly deflected when inserted through the support members during assembly and which include outwardly extending portions for restricting movement in the opposite direction during outward extension of the slidable arm. The C-shaped end has a resilient construction adapted for being releasably attached to a vertical depending leg of the walker for providing additional carrier bracing.

Still another aspect of the invention provides a side panel geometry wherein lateral edges of each side panel slant rearwardly from the upper panel edge to the lower panel edge. The inverted U-shaped handle portions have an inner curvature sized and shaped to frictionally engage a horizontal frame member of the walker and enable the respective side panels to be pivotally supported thereon. Upon suspending the carrier from the horizontal frame member a center of the inner curvature and a lower edge of the front panel intersect a common vertical plane.

These and other objects and aspects of the invention are achieved by the article-carrying apparatus which is described hereinbelow.

BRIEF DESCRIPTION OF THE DRAWING

The preferred embodiments of the invention will hereinafter be described in conjunction with the appended drawings provided to illustrate and not to limit the invention, where like designations denote like elements, and in which.

DETAILED DESCRIPTION OF THE PREFERRED EMBODIMENT

Figure 1A:
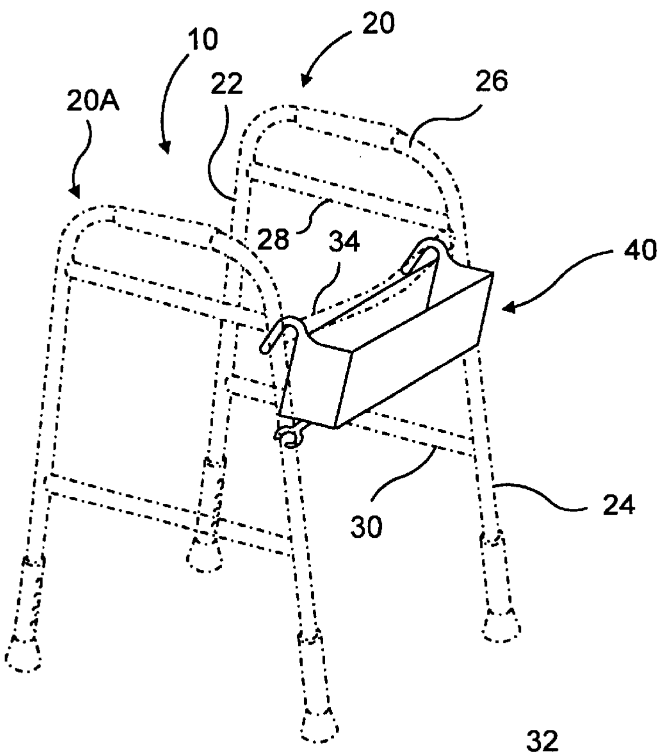
FIG. 1A is a perspective view of an article-carrying apparatus associated with a walker embodying the invention.

Referring now to the drawings, FIG. 1A illustrates a conventional walker generally designated by the numeral 10. The walker consists essentially of a three-sided frame having one side 20 formed by generally vertical legs 22 and 24 connected across their top ends by horizontal frame member 26. Horizontal braces 28 and 30 extend between legs 22 and 24. Side 20A is similarly constructed. Each of the sides is provided with a hand grip 32 to permit the individual using the frame to grasp the walker. A generally horizontal frame member 34 extends across the front of the walker near the top of the side members between sides 20 and 20A. This construction for a walker is more or less conventional and is set forth only to aid in understanding of the present invention. It will be appreciated that during operation, the user, while holding to and being supported by the stationary walker, moves forward. Then, the user must stand still, lift the walker and move it forward, when employing this device.

Figure 2A:
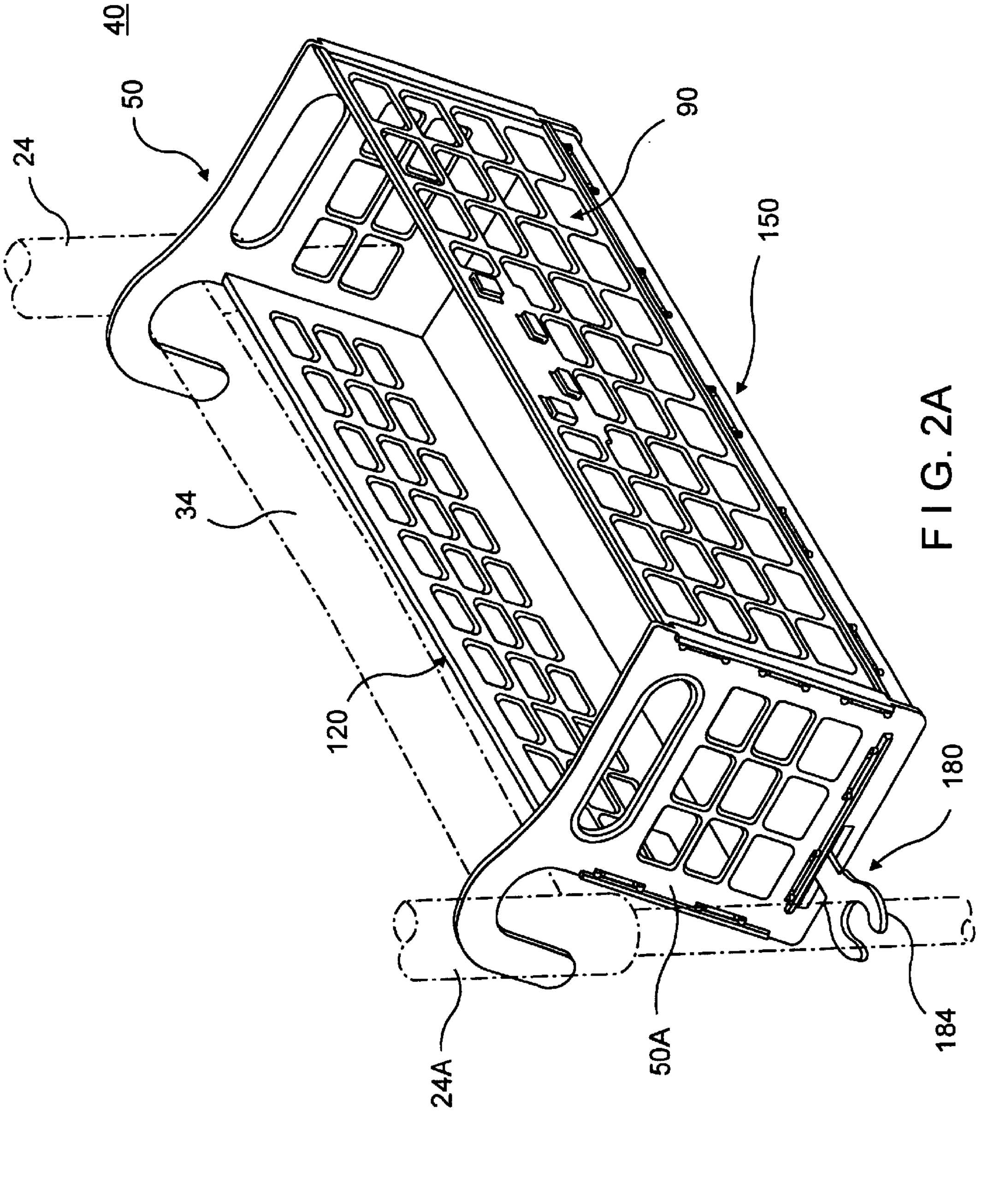
FIG. 2A is detailed perspective view of a fully-assembled article-carrying apparatus attached to a walker in accordance with the present invention.

Referring now to FIGS. 2–14, a preferred embodiment of the article carrier of the present invention is illustrated. In FIG. 2A, the carrier 40 is shown fully assembled and attached or supported on horizontal walker frame member 34. The carrier 40 includes a box-like structure having a pair of side panels 50, 50A, a front panel 90, a rear panel 120 and a base panel 150. The carrier has an open top. A pair of slidably extendable arms, shown generally as 180, are positioned underneath base panel 150 and have ends 184 configured to engage the vertical depending legs of the walker to provide additional carrier support. The aforementioned components, which comprise the entire carrier assembly of the present invention, will now be described in more detail.

Figure 1B:
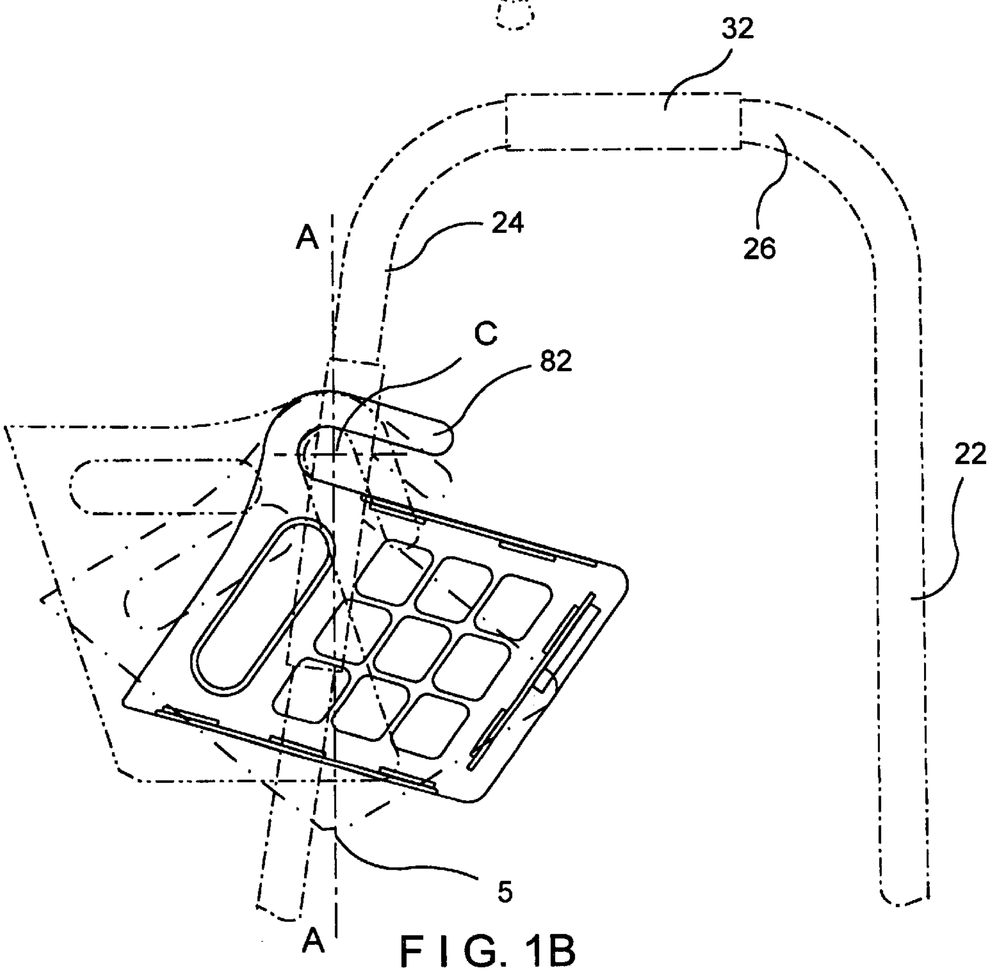
FIG. 1B is a side view of an article-carrying apparatus freely supported upon a horizontal member of a mobile walker, in accordance with one aspect of the present invention.
Figure 2B:
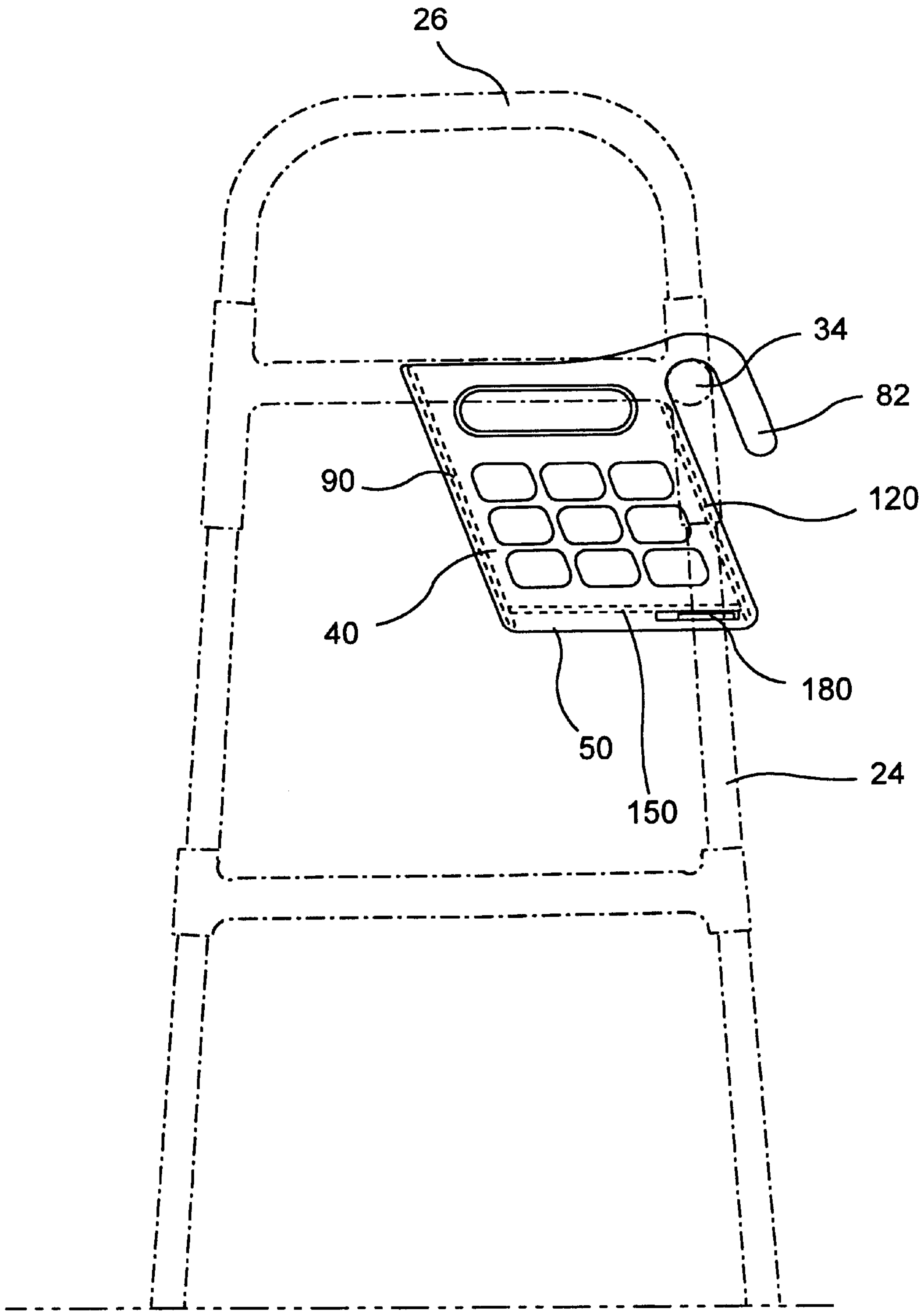
FIG. 2B illustrates an alternative positioning of the article-carrying apparatus relative to the walker.

In the embodiment of FIGS. 1A, 1B and 2A the carrier 40 is positioned on the walker 10 in such a manner that the front panel 90 and a part of the rear panel 120 are situated outwardly of the generally horizontal frame member 34, whereas the handles 82 face an inner area thereof. In an alternative embodiment of the invention, as illustrated in FIG. 2B, the front panel 90 and a part of the rear panel 120 are situated inwardly relative the generally horizontal frame member 34, whereas the handles 82 extend outwardly therefrom. In the embodiment of FIG. 2B to provide additional support to the carrier, the extendable arms 180 positioned underneath the base panel also engage the vertical depending legs of the walker.

Figure 3:
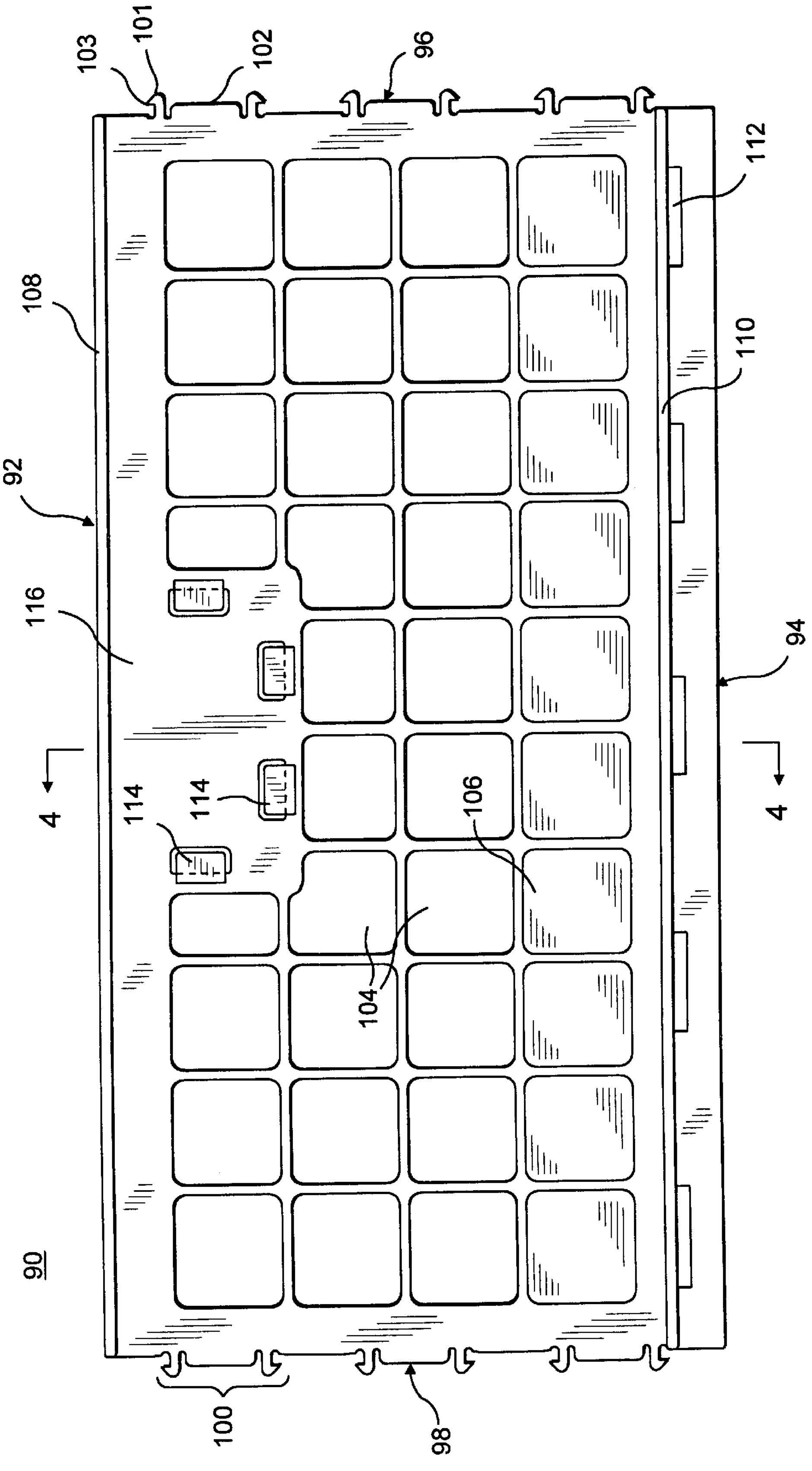
FIG. 3 is a front elevational view of the front panel of the article-carrying apparatus of the present invention.
Figure 4:
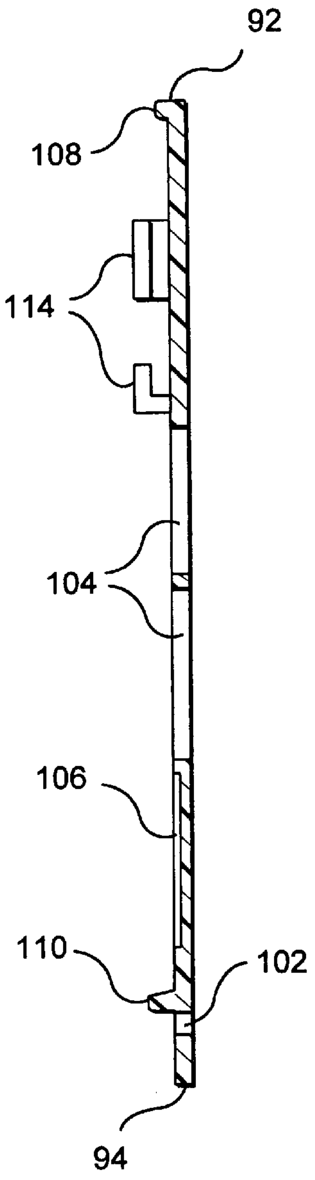
FIG. 4 is a cross-sectional view according to section line 4—4 of FIG. 3.

As best depicted in FIGS. 3–4, front panel 90 has a generally rectangular shape which is bounded by upper edge 92, lower edge 94, right edge 96 and left edge 98. A plurality of spaced-apart rectangular apertures 104 are formed in the front panel during manufacture for reducing overall panel weight. Longitudinally disposed stiffening members 108 and 110 are provided extending along upper edge 92 and proximate lower edge 94, respectively. A name plate receiving area 116 is defined by a plurality of spaced L-shaped projections 114 formed on the exterior surface of front panel 90.

Figure 14:
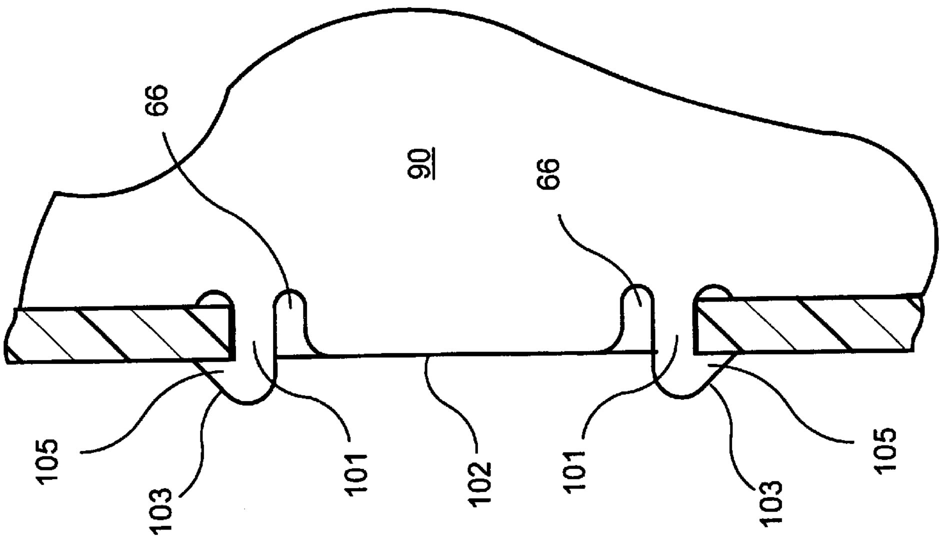
FIG. 14 is an enlarged cross-sectional view according to section line 14—14 of FIG. 13.

Front panel 90 is configured for being connected at its right edge 96 to the forward edge 56 of side panel 50. In particular, a plurality of connecting portions, each generally denoted as 100, are configured to snap-fit through a corresponding plurality of receiving apertures 66 formed along forward edge 56 of side panel 50. The connecting portions 100 and receiving apertures 66, taken together, form a connecting unit. Referring briefly to FIG. 14, the structure of a single connecting unit will now be described in more detail. Each connecting portion 100 includes a pair of resilient tong members 101 having a rigid member 102 extending therebetween. Each resilient tong member further includes a tapered outer surface 103 at its tip for effecting the temporary inward deflection of the tong member during insertion through the corresponding aperture 66. Once inserted through the corresponding aperture 66, outwardly extending tong member projections 105 prevent inadvertent detachment of the snap-fit connection. Although the aforementioned connecting unit description has been provided with particular reference to connecting portions 100 and receiving apertures 66, it is to be understood that each of the connecting units providing panel-to-panel connection have similar connection structures. Left edge 98 of front panel 90 is snap fitted to the forward edge of corresponding side panel 50A in like manner. Front panel 90 is further provided with a plurality of apertures 112 sized and shaped for snap-fit connection to connecting portions 160 extending from front edge 152 of base panel 150.

Figure 11:
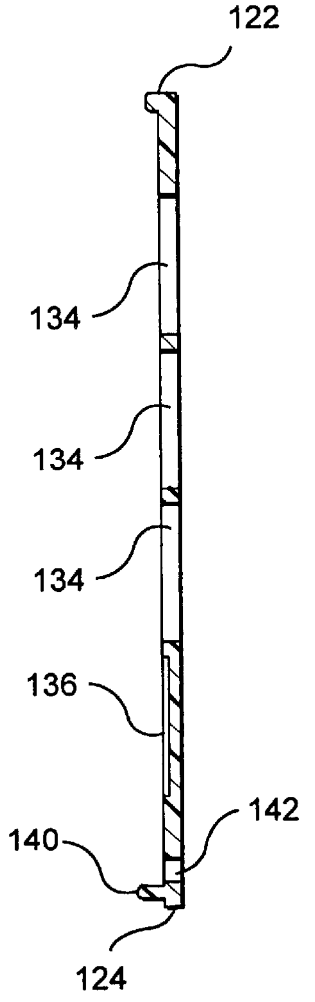
FIG. 11 is a cross-sectional view according to section line 11—11 of FIG. 8.
Figure 8:
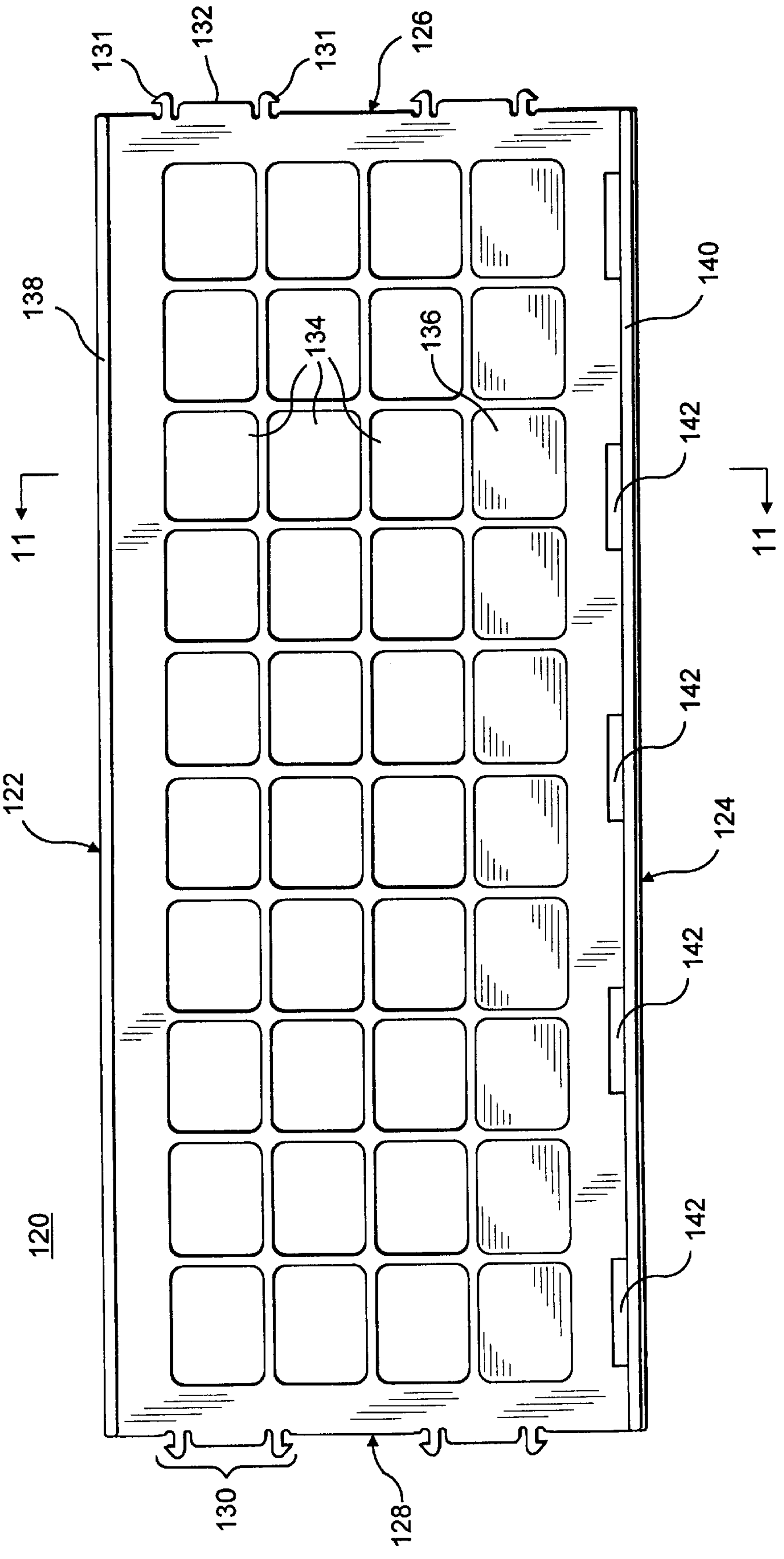
FIG. 8 is a front elevation view of the rear panel of the article-carrying apparatus of the present invention.

As best depicted in FIGS. 8 and 11, rear panel 120 is similar in structure to front panel 90. In particular, rear panel 120 has generally rectangular shape bounded by upper edge 122, lower edge 124, right edge 126 and left edge 128. A plurality of rectangular apertures 134 are formed in the rear panel for reducing overall panel weight. Longitudinally disposed stiffening members 138 and 140 are provided extending along upper edge 122 and lower edge 124. The rear panel 120 has connecting portions 130 (including tongs 131 and stiffening member 132) which have a structure and function similar to that of already described hereinabove corresponding elements of front panel. The connecting portions 130 along right edge 126 are configured to be snap-fitted into corresponding apertures 62 formed along rear edge 58 of side panel 50. Similarly, left edge 128 forms a snap fit connection to a corresponding rear edge of side panel 50A. Rear panel is further provided with a plurality of apertures 142 sized and shaped for being snap fitted to connection portions 160 extending from the rear edge 154 of base panel 150. Panel assembly is completed upon effecting snap-fit connection between the right and left edges, 156 and 158, of the base panel and the corresponding lower edges of the side panels 50, 50A.

Figure 6:
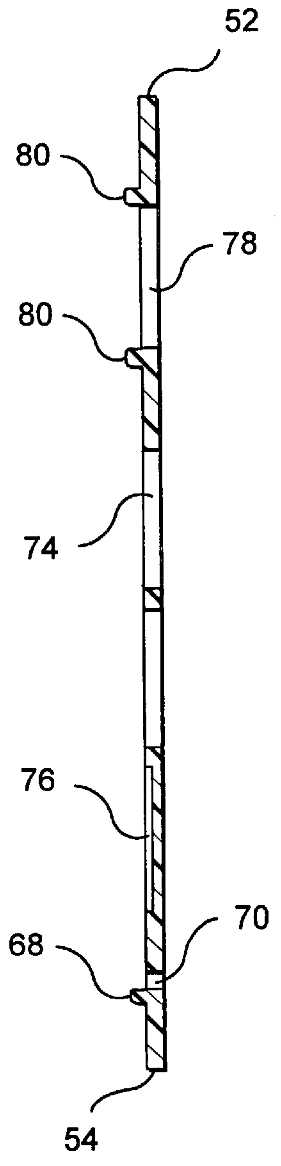
FIG. 6 is a cross-sectional view according to section line 6—6 of FIG. 5.
Figure 7:
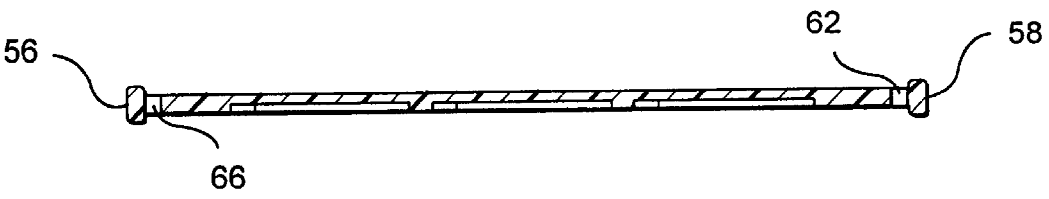
FIG. 7 is a cross-sectional view according to section line 7—7 of FIG. 5.
Figure 5:
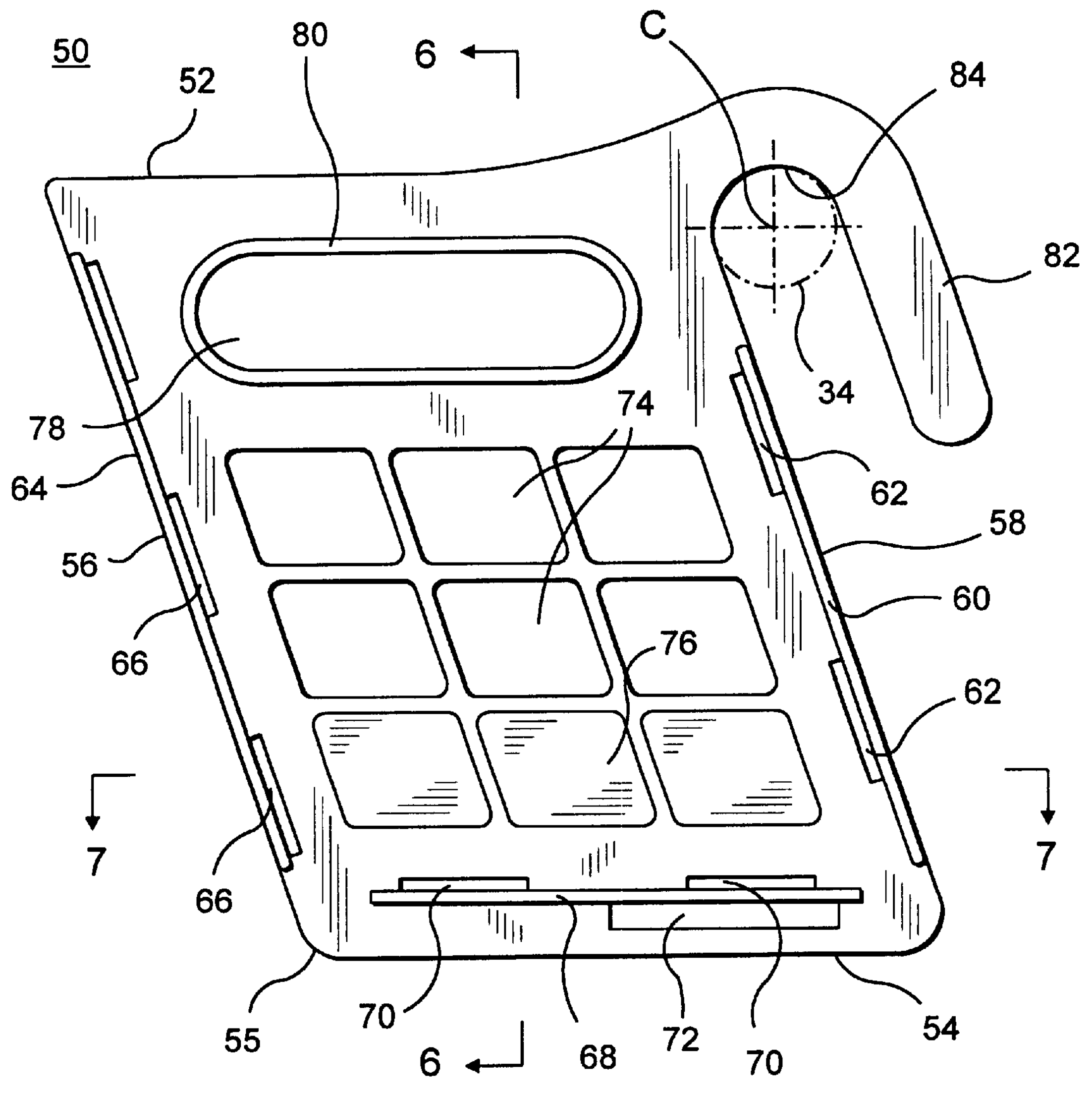
FIG. 5 is a side elevation view of a side panel of the article-carrying apparatus of the present invention.

Referring mainly to FIGS. 5–7, additional side panel structure will now be described in more detail with specific reference to side panel 50, which is substantially identical in construction to corresponding side panel 50A. Side panel 50 is generally bounded by upper edge 52, lower edge 54, front or forward edge 56, and rear edge 58. Unlike the front 90, rear 120 and base 150 panels, the side panels are not rectangularly shaped. Instead, front and rear edges 56 and 58 have a rearward slant from upper edge 52 to lower edge 55, defining a panel geometry having oblique interior angles. As will become apparent, this is a significant feature of the present invention. An integral handle portion 82 having a generally inverted U shape extends outwardly from the rear upper corner of side panel 50. The handle portion includes an inner curvature 84 which is sized and shaped for being pivotally supported on horizontal cross member 34. The pivotal motion of the handles and carrier relative the horizontal cross member 34 is illustrated in FIG. 1B. In addition to those features previously described, side panel 50 is provided with a hand-receiving aperture 78 enabling the article carrier to be grasped and manually transported for use apart from the mobile walker. An arm-receiving aperture 72 is provided for enabling a C-shaped end of an extendible arm (further described below) to be passed therethrough. Furthermore, side panel 50 preferably includes stiffening members 60, 64 and 80.

Figure 10:
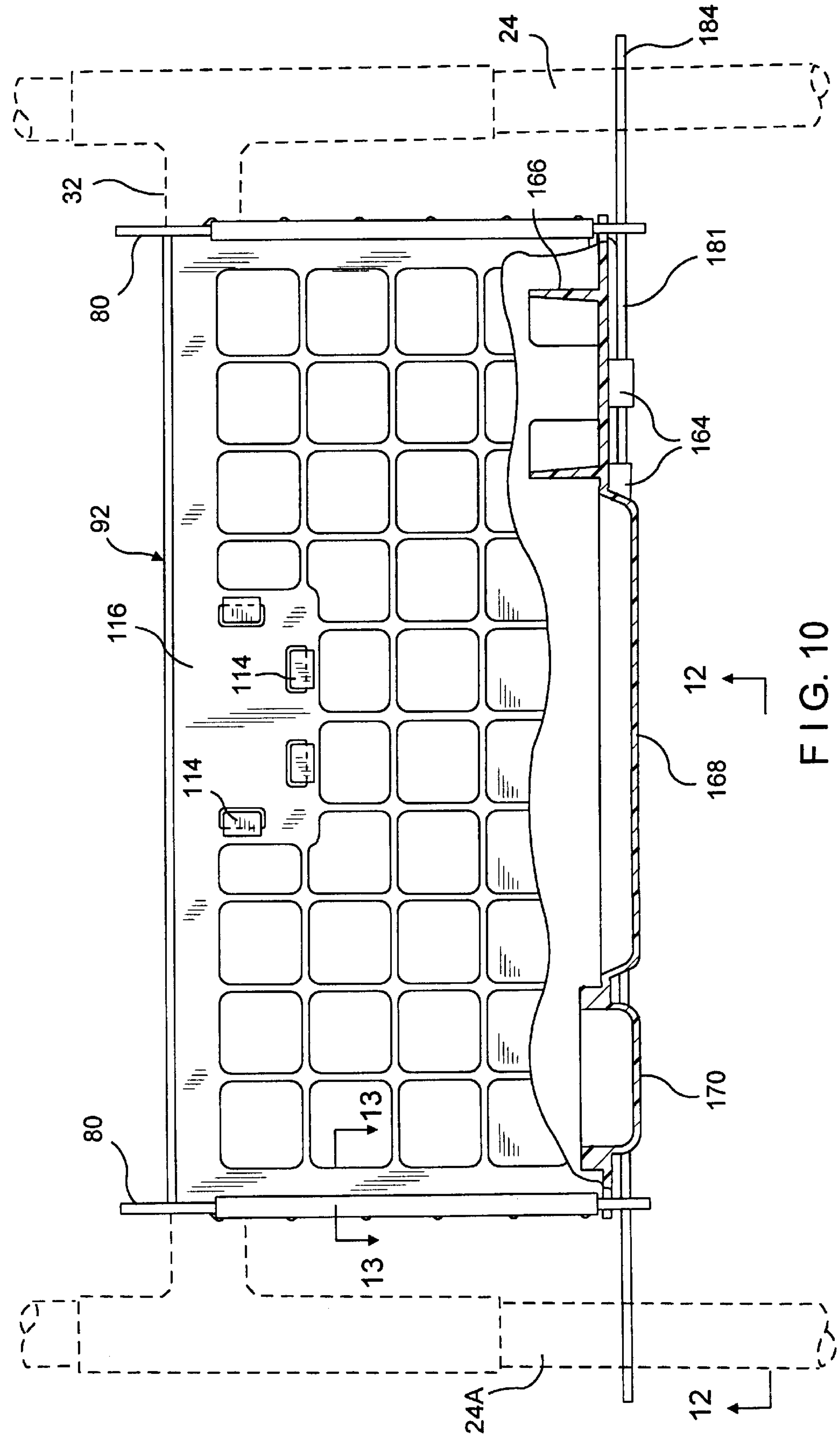
FIG. 10 is a partially fragmented front view of the article-carrying apparatus of the present invention, with a front panel being removed and the base panel shown in cross section.

As best depicted in FIG. 10, an upper surface of base panel 150 is preferably formed having integral depressions 168, 170 formed therein for restricting sliding movement of articles contained therein. Furthermore, base panel 150 is preferably formed having one or more integral curved walls 166 extending upwardly from the upper surface thereof and together defining a generally circular cup-receiving area.

Figure 9:
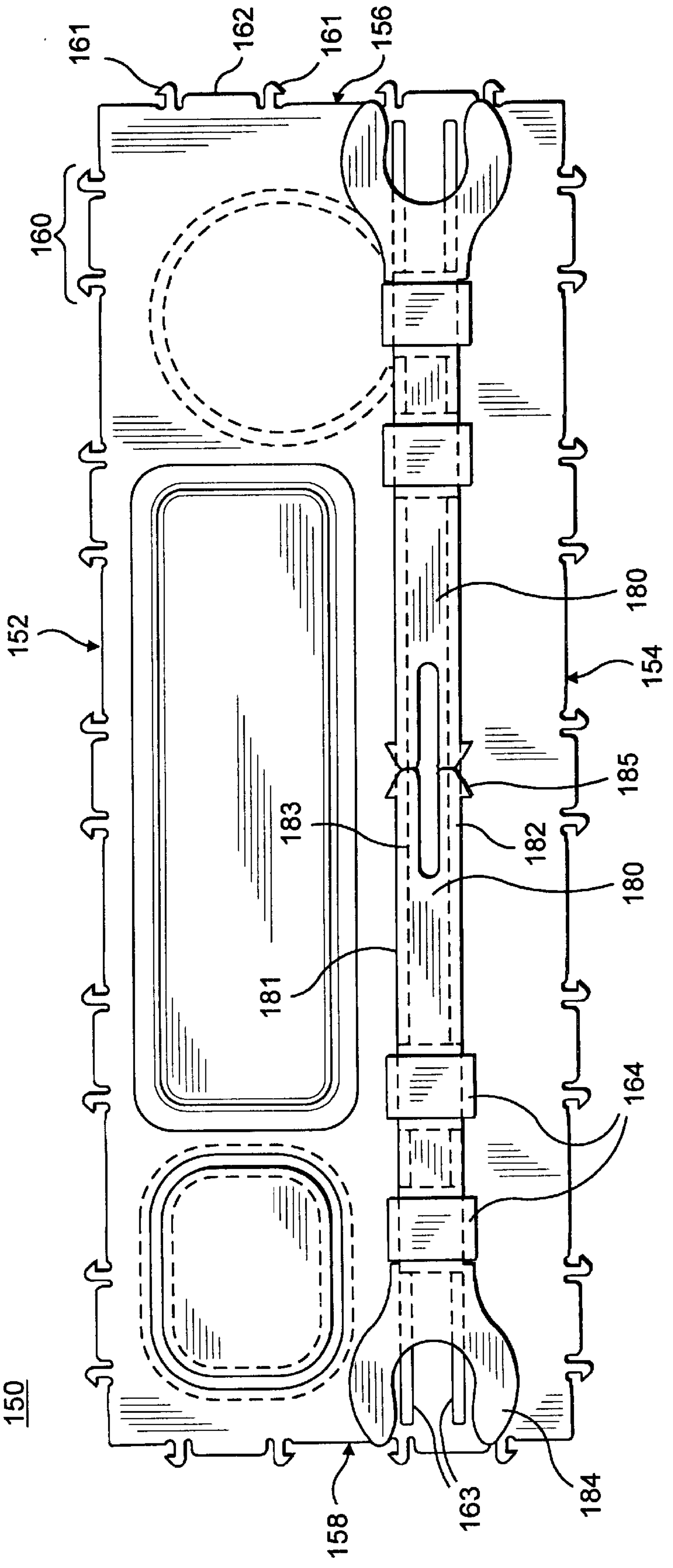
FIG. 9 is a bottom plan view of the base panel of the article-carrying apparatus of the present invention.
Figure 12:
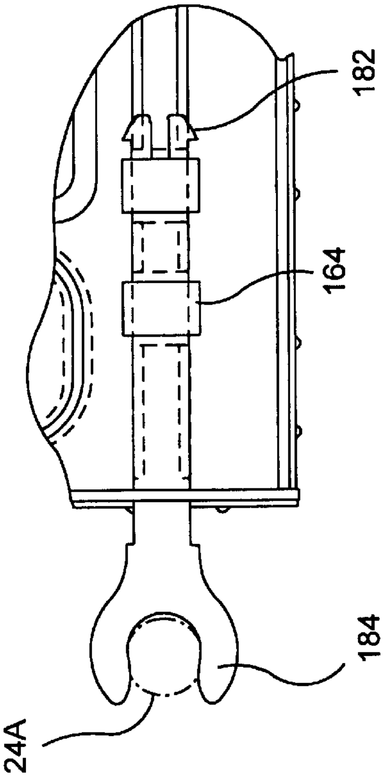
FIG. 12 is a view according to section line 12—12 of FIG. 10.
Figure 13:
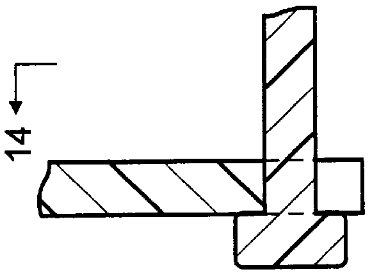
FIG. 13 is a cross-sectional view according to section line 13—13 of FIG. 10.

As best depicted in FIGS. 9, 10 and 12, a pair of slidably extendable arms 180 secured to the lower surface of base panel 150 are provided. Any conventional configuration of the extendable arms is contemplated by the invention. However, in the preferred embodiment, each slidable, extendable arm 180 has a unitary molded construction and includes a main body portion 181 having a forked end 182 and an opposite resilient C-shaped end 184. The main body portion 181 has a substantially rectangular cross-sectional area sized for facilitating sliding movement of the main body through integral support members 164 depending from the lower surface of base panel 150. Forked end 182 includes a pair of resilient prongs 183 which deflect inwardly toward each other when passed through the support members 164 during assembly. Each prong 183 has an outwardly extending portion 185 which restricts the inadvertent passage of the forked end 182 through the support members when the arm 180 is outwardly extended. The resilient C-shaped end 184 has an interior curved surface sized and shaped for being releasably attached to a forward vertical leg 24, 24A of the walker. In this manner, the arms can be extended outwardly and attached to a forward pair of vertical depending walker legs to provide carrier bracing if necessary or desired. Furthermore, by adjusting the degree to which each arm is extended, the relative horizontal position of the carrier with respect to the walker can be adjusted. Consequently, various designs of the walker can be accommodated by positioning the carrier basket closer to or further away from a specific leg of the walker.

The carrier is preferably constructed of a resilient plastic material, such as for example polypropylene or other similar materials. Although a plastic material is preferred, it is to be understood that wires, mesh, perforated sheets may be alternatively utilized in fabrication of the carrier of the present invention. Usage of these materials depends on the particular requirements associated with a specific design of a walker or nature and disability of a user.

Due in part to the above-described unique side panel geometry, the carrier 40 can be used to hold articles even with arms 180 in the retracted position. Referring now to FIGS. 1B and 5, when the assembled carrier is supported on the cross member 34 such that the side panels 50, 50A are free to pivot thereabout, the panels have an equilibrium orientation in which a center C of the inner curvature 84 of handle member 82 and diagonally opposite panel corner 55 intersect a common line or plane of gravity A—A. As a result, the added weight associated with the addition of articles to the carrier does not tend to cause the carrier to tip since this orientation is maintained. This makes it possible to carry articles within the carrier 40 when the slidably extendable arms are not engaging the legs of the walker. In this condition the articles can be discharged simply through the pivotal rotation of the handles 82 and the entire carrier relative to the horizontal frame member 34 (see FIG. 1B). It should be noted that reference is made to FIG. 5 solely for the purpose of feature identification. The equilibrium orientation of the carrier 40 and the side panel 50 is shown in FIG. 1B.

While the preferred embodiments of the invention have been illustrated and described, it will be clear that the invention is not limited to these embodiments only. Numerous modifications, changes, variations, substitutions and equivalents will be apparent to those skilled in the art without departing from the spirit and scope of the present invention as described in the claims.

What is claimed is:

1. An article-carrying apparatus adapted for attachment to a mobile walker having a frame including at least one generally horizontal frame member supported by one or more generally vertical depending legs, the article-carrying apparatus comprising:

a front panel;

a rear panel;

a pair of opposed side panels each having an inverted U-shaped handle portion extending from a rear upper corner thereof, each handle portion having an inner curvature shaped for engaging said at least one generally horizontal frame member and enabling the side panel to be pivotally supported thereon;

a base panel having upper and lower surfaces;

wherein the front, rear, and opposed side panels are interconnected along outer edges with the upper edge of each panel collectively forming an upper opening of the apparatus; and a pair of slidable arms situated beneath the lower surface of said base panel, said arms for being outwardly extendable from said base panel so as to releasably engage a front pair of said one or more generally vertical depending legs.

2. An article-carrying apparatus as recited in claim 1, wherein said front, rear, base and side panels having peripherally positioned snap-fit connection means for facilitating panel-to-panel attachment during assembly of said apparatus, said snap-fit connection means further comprise a plurality of snap-fit connecting units, each connecting unit comprising:

a pair of resilient tong members extending outwardly from the periphery of a first panel and having a stiffening member extending therebetween; and a slot-shaped opening provided in a corresponding adjacent second panel, said opening sized and shaped for having said resilient tong members snap-fittingly received therethrough.

3. An article-carrying apparatus as recited in claim 2, further comprising arm support members formed at the lower surface of said base panel, said integral arm support members configured for securing said slidable arms beneath said lower surface without impeding extension and retraction thereof in a substantially horizontal direction.

4. An article-carrying apparatus as recited in claim 3, wherein each of said slidably extendable arm further comprising:

a main body portion adapted for slidable motion within at least one of said arm support members;

a forked end having a pair of resilient prongs capable of being inwardly deflected toward each other to provide passage of said forked end through at least one of said support members during assembly of said apparatus, each prong having an outwardly extending portion for restricting the inadvertent passage of said forked end through said at least one support member during the outward extension of said arm; and a resilient c-shaped end opposite to the forked end and adapted for releasable attachment to the front vertical depending legs of said walker.

5. An article-carrying apparatus as recited in claim 4, wherein each of said side panels has an aperture formed along a lower edge thereof, so as to facilitate passage of the c-shaped end of one of said sliding arms therethrough.

6. An article-carrying apparatus as recited in claim 1, wherein each of said side panels is generally bounded by an upper edge, a lower edge and a pair of lateral edges slanting rearwardly from said upper edge toward said lower edge to form a series of oblique interior panel angles.

7. An article-carrying apparatus as recited in claim 1, further comprising a hand-receiving aperture formed in each of said side panels for enabling said apparatus to be grasped and manually transported independent of said walker.

8. An article-carrying apparatus as recited in claim 1, wherein each of said front, rear and side panels, and said slidable arms are formed as a unitary molded body.

9. An article-carrying apparatus as recited in claim 1, further comprising a plurality of spaced L-shaped projections formed on an exterior surface of said front panel and defining a name plate receiving area.

10. An article-carrying apparatus as recited in claim 1, wherein said base panel further comprises at least one recessed area formed in an upper surface thereof for restricting the movement of articles contained therein.

11. An article-carrying apparatus as recited in claim 1, wherein said bare panel further comprises one or more curved walls extending upwardly from the upper surface thereof and defining a generally circular cup-receiving area.

12. An article-carrying apparatus adapted for attachment to a mobile walker having a frame including at least one generally horizontal frame member supported by one or more generally vertical depending legs, said article-carrying apparatus comprising:

front, rear, base and side panels are connected along portions of their respective peripheries to form an article containment region;

said side panels each having a shape generally defined an upper edge, a lower edge, and pair of lateral edges slanting rearwardly from said upper edge toward said lower edge; and said side panels each having an inverted U-shaped handle portion extending from a rear upper corner thereof, the handle portion having an inner curvature sized and shaped for frictionally engaging said at least one generally horizontal frame member and enabling the side panel to be pivotally supported thereon, whereby upon freely suspending said article-carrying apparatus from said horizontal frame member, a center of said inner curvature and a lower edge of said front panel intersect a common vertical plane.

13. An article-carrying apparatus as recited in claim 12, further comprising a pair of arms slidably extendible from beneath a lower surface of said base panel for engaging a forward pair of said generally vertical depending legs, said engagement restricting movement of said apparatus relative said walker.

14. A method for securing an article carrying apparatus to a mobile walker of the type having a frame including at least one generally horizontal frame member supported by one or more generally vertical depending legs, the article-carrying apparatus including a front panel, a rear panel, a pair of side panels and base panel, the side panels each having an inverted U-shaped handle portion extending therefrom, wherein the front, rear, and opposed side panels are interconnected along outer edges with the upper edge of each panel collectively forming an upper opening of the apparatus, the base panel having a pair of slidably extendible arms maintained beneath a lower surface thereof, each of the arms having a c-shaped end adapted for engaging one of said generally vertical depending legs, the method comprising the steps of:

hanging said inverted U-shaped handle portions of said side panels over said at least one generally horizontal frame member;

outwardly extending said slidably extendible arms; and frictionally securing the C-shaped ends of said arms to a forward pair of said one or more generally vertical depending legs.

* * * * *